United States Patent
Hanafusa et al.

(10) Patent No.: US 6,688,022 B2
(45) Date of Patent: Feb. 10, 2004

(54) WALK BEHIND SELF-PROPELLED CRAWLER SNOWPLOW

(75) Inventors: Jitsumi Hanafusa, Wako (JP); Masanori Takeishi, Wako (JP); Kenji Kuroiwa, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/236,415

(22) Filed: Sep. 6, 2002

(65) Prior Publication Data

US 2003/0005603 A1 Jan. 9, 2003

Related U.S. Application Data

(62) Division of application No. 09/819,479, filed on Mar. 28, 2001, now Pat. No. 6,470,603.

(30) Foreign Application Priority Data

Mar. 29, 2000 (JP) ........................................ 2000-092442

(51) Int. Cl.$^7$ ............................. E01H 5/09; F16H 7/12
(52) U.S. Cl. ........................................ 37/257; 474/109
(58) Field of Search ........................ 37/244, 242, 246, 37/248, 252–257, 266; 180/656; 192/34, 3.58, 56, 150; 474/101–110, 136, 138; 74/866

(56) References Cited

U.S. PATENT DOCUMENTS

| | | | | |
|---|---|---|---|---|
| 4,062,135 A | * | 12/1977 | Dobberpuhl | 37/245 |
| 4,321,991 A | * | 3/1982 | Teijido et al. | 477/39 |
| 4,457,086 A | * | 7/1984 | Bacon | 37/257 |
| 4,478,595 A | * | 10/1984 | Hayakawa et al. | 474/109 |
| 4,537,226 A | * | 8/1985 | Gotoh | 139/100 |
| 4,783,915 A | * | 11/1988 | Sasaki et al. | 37/251 |
| 5,020,169 A | * | 6/1991 | Hamada et al. | 5/10.2 |
| 5,410,824 A | * | 5/1995 | Pedersen | 37/242 |
| 6,131,316 A | * | 10/2000 | Yoshina et al. | 37/242 |

FOREIGN PATENT DOCUMENTS

| JP | 50014720 | * | 2/1975 |
|---|---|---|---|
| JP | 51034111 | * | 8/1976 |

* cited by examiner

Primary Examiner—Robert E. Pezzuto
(74) Attorney, Agent, or Firm—Adams & Wilks

(57) ABSTRACT

A walk behind self-propelled crawler snowplow includes a snowplow mechanism driven by an engine via a belt drive power transmission mechanism, and an overload protection device associated with the belt drive power transmission mechanism for protecting the engine against overload. The overload protection device comprises a tension sensor for detecting the tension in an endless belt and generating an electric overload signal to disengage an electromagnetic clutch in the belt drive power transmission mechanism when a belt tension greater than a predetermined value is detected.

8 Claims, 8 Drawing Sheets

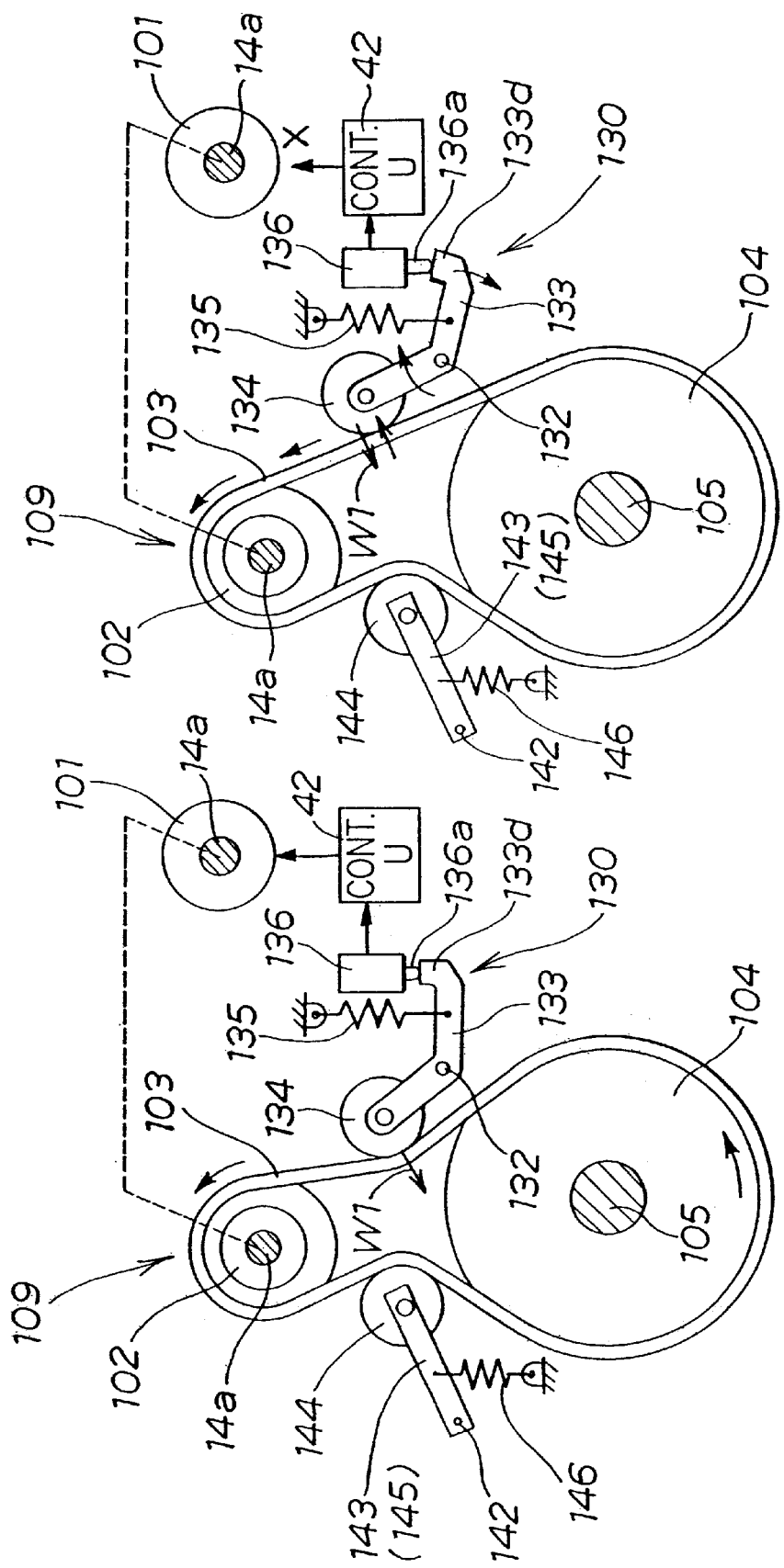

WALK BEHIND SELF-PROPELLED CRAWLER SNOWPLOW

The present application is a division of prior U.S. application Ser. No. 09/819,479, filed on Mar. 28, 2001, now U.S. Pat. No. 6,470,603, which is hereby incorporated by reference, and priority thereto for common subject matter is hereby claimed.

BACKGROUND OF THE INVENTION

The present invention relates to an improvement in a walk behind self-propelled crawler snowplow equipped with a snowplow mechanism having an auger and a blower.

Walk behind self-propelled crawler snowplow machines equipped with an auger and a blower are known as disclosed, for example, in Japanese Utility Model Publication No. (SHO) 51-34111.

The disclosed snowplow machine includes a belt drive power transmission system having a driving pulley connected to the output shaft of an engine, a driven pulley connected to one end of a rotating shaft, and an endless belt trained around the driving and driven pulleys for transmitting power from the engine to the rotating shaft, so that an auger and a blower connected to the rotating shaft are driven in rotation by the engine power. In operation, the auger rotates to cut snow away from a road, for example, and feed a cut mass of snow to the blower which rotates to blow out the snow through a discharge duct to a place distant from the snowplow machine. The snow on the road is thus removed.

During the snow plowing operation, the auger may be subjected to a momentary overload when interference occurs between the auger and a rock or other object projecting from the road surface. The auger may be also subjected to a continuous overload when foreign matter, such as a stone, wood piece or block of ice, is caught between an auger case and the auger. Under such overloaded condition, the auger is forcibly stopped from rotating and an excessively large torque is developed in a drive unit (including the engine and the power transmission system). To withstand such a large torque, the drive unit requires extensive strengthening of its structural components, which incur additional cost.

According to one prior improvement shown in Japanese Utility Model Laid-open Publication No. (SHO) 50-14720, shear bolts are used to mount the auger to the rotating shaft. When the auger is subjected to an overload during snow removing operation, the shear bolts are broken to thereby separate the connection between the auger and the rotating shaft, allowing the rotating shaft to further continue rotation alone.

In order to restart the snow removing operation, the broken shear bolts must be replaced with new ones. However, since the shear bolts are located at a radial inward position of auger blades which is relatively uneasy to access, shear bolt replacement is tedious and time-consuming. This leads to a relatively long downtime of the snowplow machine and a reduced efficiency of the snow removing operation.

SUMMARY OF THE INVENTION

It is accordingly an object of the present invention to provide a walk behind self-propelled crawler snowplow which is capable of achieving snow removing operation with improved efficiency.

To achieve the foregoing object, according to the present invention, there is provided a walk behind self-propelled crawler snowplow comprising a snowplow mechanism having a rotating shaft, an auger and a blower that are connected in driven relation to the rotating shaft, an engine for driving the snowplow mechanism, a belt drive power transmission mechanism for transmitting rotational power from the engine to the rotating shaft, the power transmission mechanism having a driving pulley releasably coupled with an output shaft of the engine, an electromagnetic clutch adapted to be engaged and disengaged for connecting and disconnecting the engine output shaft and the driving pulley, a driven pulley connected to the rotating shaft, and an endless drive belt trained around the driving and driven pulleys, and an overload protection device associated with the belt drive power transmission mechanism for protecting the engine against overload.

In one preferred form of the present invention, the overload protection device comprises a tension sensor for detecting a tension in the endless belt and generating an electric overload signal to disengage the electromagnetic clutch when a belt tension greater than a predetermined value is detected.

Preferably, the tension sensor comprises a tension roller, a bias means for urging the tension roller against an outer circumferential surface of the endless belt to cause a tension run of the belt to flex inwardly, and a detector unit for detecting tautness of the belt associated with an overload condition by detecting displacement of the tension roller in a direction outward of the endless belt when the tension run of the belt is stretched substantially due an overload acting on the snowplow mechanism.

The tension sensor may further include a pivotally movable lever having one end on which the tension roller is rotatably mounted, the detector unit including an electric switch electrically connected with the electromagnetic clutch and having an actuator held in contact with the opposite end of the lever, the actuator being movable in response to pivotal movement of the lever to turn on and off the switch.

The above and other objects, features and advantages of the present invention will become manifest to those versed in the art upon making reference to the following description and accompanying sheets of drawings in which a certain preferred structural embodiment incorporating the principle of the invention is shown by way of illustrative example.

BRIEF DESCRIPTION OF THE DRAWINGS

FIGS. 8A and 8B are diagrammatical views showing the operation of the overload protection device.

DETAILED DESCRIPTION OF THE PREFERRED EMBODIMENT

The following description is merely exemplary in nature and is in no way intended to limit the invention or its application or use.

Figure 1:
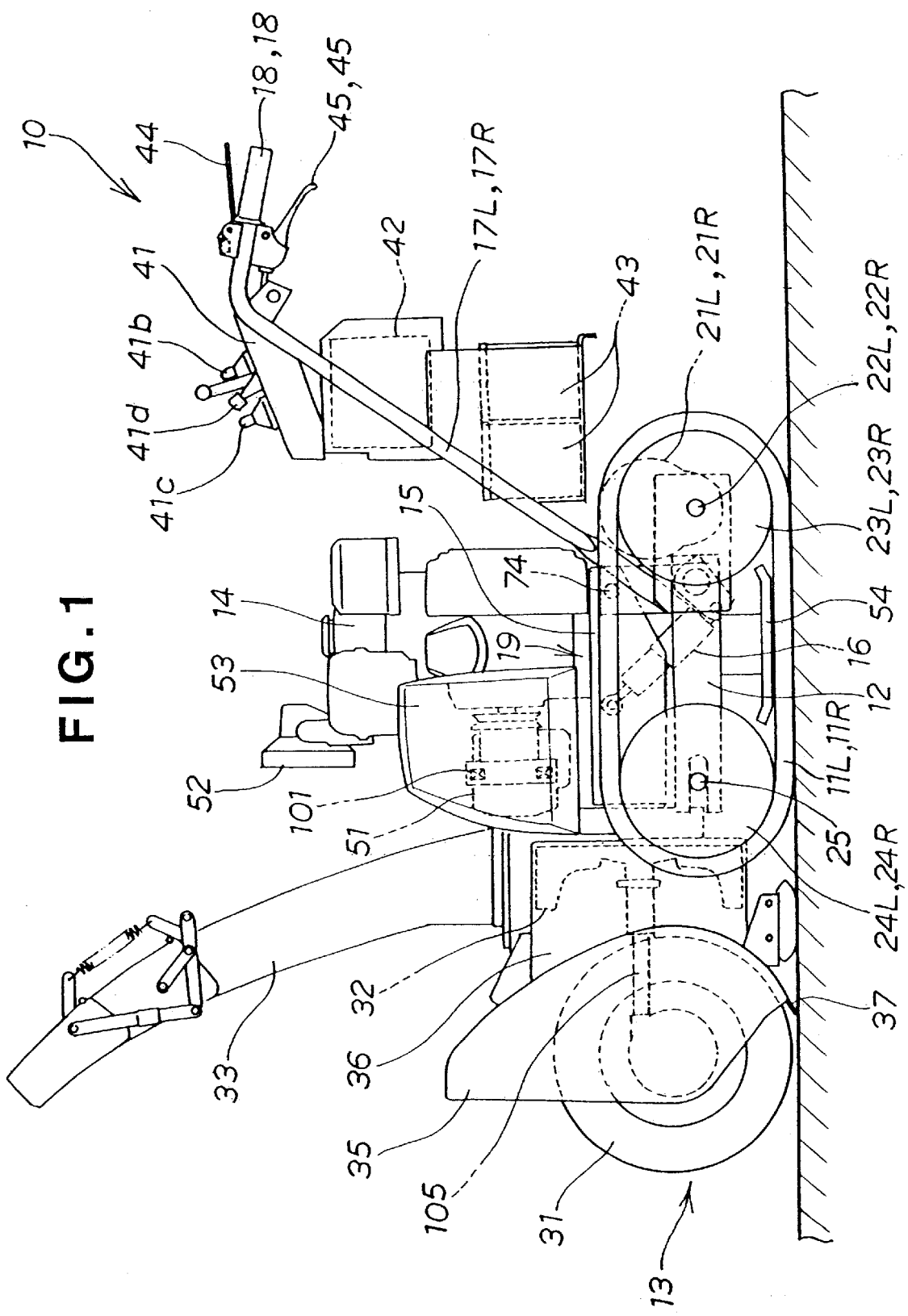
FIG. 1 is a left side view of a walk behind self-propelled crawler snowplow according to an embodiment of the present invention.

Referring to the drawings and FIG. 1 in particular, there is shown a walk behind self-propelled crawler snowplow 10 according to an embodiment of the present invention. The snowplow 10 generally comprises a propelling frame 12 carrying thereon left and right crawler belts (only the left crawler belt 11L being shown), a vehicle frame 15 carrying thereon a snowplow mechanism 13 and an engine (prime motor) 14 for driving the snowplow mechanism 13, a frame lift mechanism 16 operable to lift a front end portion of the vehicle frame 15 up and down relative to the propelling frame 12, and a pair of left and right operation handlebars 17L and 17R extending from a rear portion of the propelling frame 12 obliquely upward in a rearward direction of the snowplow 10. The propelling frame 12 and the vehicle frame 15 jointly form a vehicle body 19.

The left and right crawler belts 11L, 11R are driven by left and right electric motors 21L, 21R (only right one being shown), respectively. The crawler belts 11L, 11R are each trained around a driving wheel 23L, 23R and an idler wheel 24L, 24R. The driving wheel 23L, 23R is disposed on a rear side of the crawler belt 11L, 11R, and the idler wheel 24L, 24R is disposed on a front side of the crawler belt 11L, 11R.

The snowplow mechanism 13 has an auger 31, a blower 32 and a discharge duct 33 that are mounted to a front portion of the vehicle frame 15. In operation, the auger 31 rotates to cut snow away from a road, for example, and feed the cut mass of snow to the blower 32 which blows out the snow through the discharge duct 33 to a position far distant from the snowplow 10.

The operation handlebars 17L, 17R are gripped by a human operator (not shown) walking behind the snowplow 10 in order to maneuver the snowplow 10. A control board 41, a control unit 42 and batteries 43 are arranged in a vertical space defined between the handlebars 17L, 17R and they are mounted to the handlebars 17L, 17R in the order named when viewed from the top to the bottom of FIG. 1.

The operation handlebars 17L, 17R each have a grip 18 at the distal end (free end) thereof. The left handlebar 17L has a clutch lever 44 disposed in close proximity to a grip 18 so that the human operator can manipulate the clutch lever 44 to turn on and off (or engage and disengage) an electromagnetic clutch 101 while maintaining an appropriate grip on the grip 18. The left and right handlebars 17L, 17R further have turn control levers 45 associated with the respective grips 18, 18.

The crawler snowplow 10 of the foregoing construction is self-propelled by the crawler belts 11L, 11R driven by the electric motors 21L, 21R and is also maneuvered by the human operator walking behind the snowplow 10 while handling the handlebars 17L, 17R.

In FIG. 1 reference numeral 35 denotes an auger case, numeral 36 denotes a blower case, numeral 37 denotes a scraper formed integrally with a lower edge of the auger case 35, numeral 51 denotes a charging generator for charging the batteries 43, numeral 52 denotes a lamp, numeral 53 denotes a cover for protecting the generator 51 and the electromagnetic clutch 101, and numeral 54 denotes a stabilizer for urging each crawler belt 11L, 11R downward against the ground surface.

It appears clear from the foregoing description that the snowplow mechanism 13 is disposed on a front portion of the vehicle body 19, the engine 14 for driving the snowplow mechanism 13 is disposed on a longitudinal central portion of the vehicle body 19, the crawler belts 11L, 11R are disposed on left and right sides of the vehicle body 19, the electric motors 21L, 21R for driving the corresponding crawler belts 11L, 11R are disposed on a rear portion of the vehicle body 19, the left and right operation handlebars 17L, 17R extend from the rear portion of the vehicle body 19 obliquely upward in a rearward direction of the snowplow, and the control board 41, control unit 42 and batteries 43 are located at higher levels than the crawler belts 11L, 11R.

Figure 2:
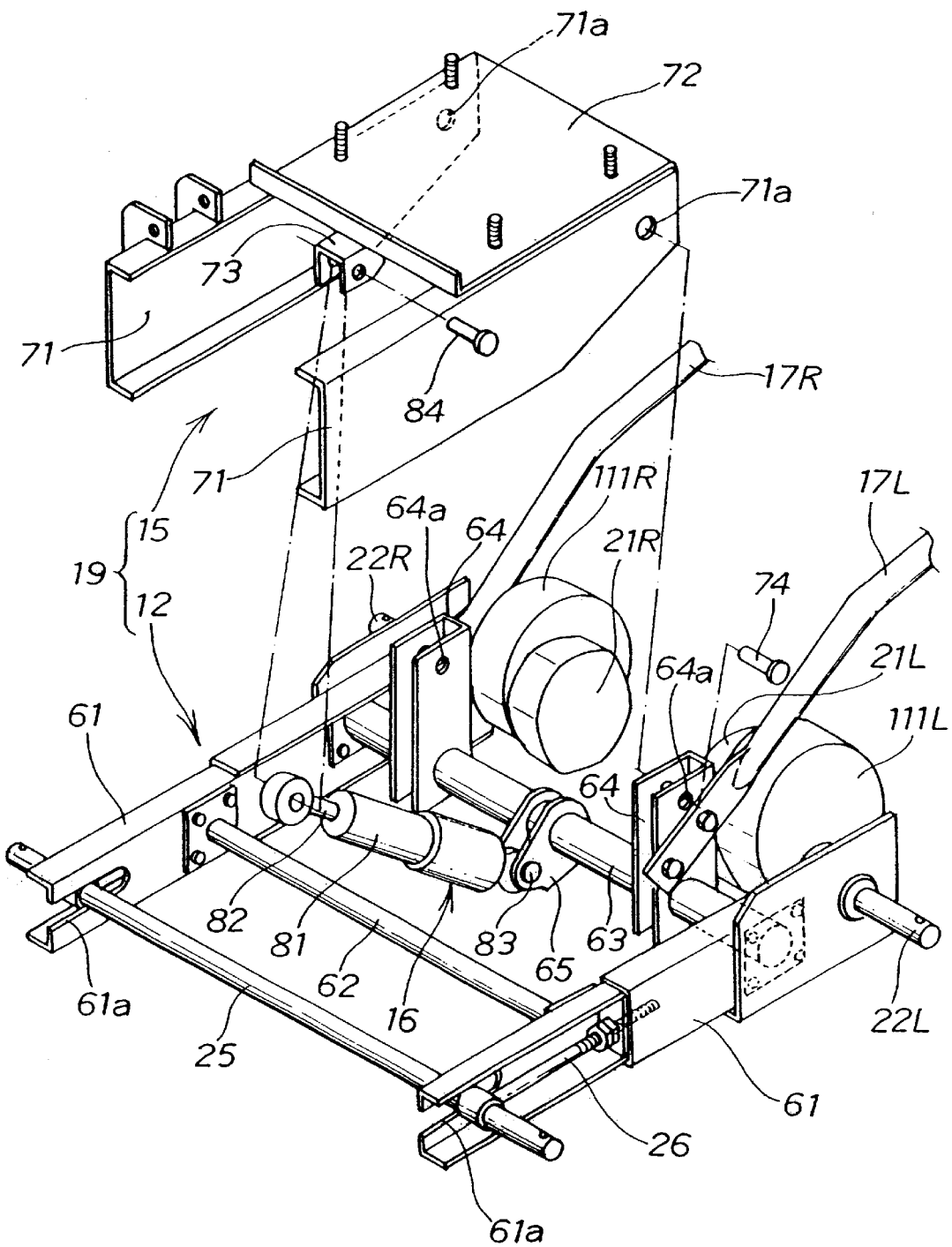
FIG. 2 is an exploded perspective view showing a propelling frame, a vehicle frame and a frame lift mechanism of the crawler snowplow.

As shown in FIG. 2, the propelling frame 12 is composed of a pair of parallel spaced left and right side members 61, 61 extending in the longitudinal direction of the vehicle body 19, a front cross member 62 interconnecting respective front portions of the side members 61, 61, and a rear cross member 63 interconnecting respective rear portions of the side members 61, 61. The propelling frame 12 further has a pair of side brackets 64, 64 connected to left and right end portions of the rear cross member 63 adjacent to the side members 61, and a central bracket 65 connected to a central portion the rear cross, member 63 which corresponds in position to a widthwise or crosswise central portion of the propelling frame 12.

The electric motors 21L, 21R are mounted to respective rear end portions of the side members 61, 61. Respective front end portions of the side members 61, 61 have a longitudinal slot 61a for receiving therein a longitudinal portion of a front axle 25 so that the front axle 25 is rotatably supported on the front end portions of the side members 61, 61. The front axle 25 is movable in the longitudinal direction of the side frames 61, 61 along the slots 61a when tension adjustment devices or bolts 25 associated with the respective side frames 61 is actuated. By thus moving the front axle 25, the tension in each crawler belt 11L, 11R can be adjusted.

The left and right side brackets 64 are each comprised of a vertically extending channel member having a U-shaped cross section. The left and right handlebars 17L, 17R have respective lower end portions bolted to the opposite outer sides of the left and right side brackets 64. The side brackets 64 each have a horizontal through-hole 64a formed in an upper end portion thereof.

The vehicle frame 15 is comprised of a pair of parallel spaced left and right side members 71, 71 extending in the longitudinal direction of the vehicle body 19, and a horizontal mount base 72 extending between the side members 71, 71 astride a rear half of the side members 71 for mounting the engine 14. The vehicle frame 15 also has a support arm 73 connected to a central portion of the front edge of the mount base 72. The side members 71 each have a horizontal through-hole 71a formed in a rear end portion thereof.

The vehicle frame 15 is pivotally connected to the propelling frame 12 by means of pivot pins 74 (one being shown) inserted successively through the horizontal holes 64a in the side brackets 64 and the horizontal holes 71a in the side members 71. With this pivotal connection, a front end portion of the vehicle frame 15 is movable up and down in a vertical plane relative to the propelling frame 12.

The frame lift mechanism 16 has a cylinder actuator including a cylinder tube 81 and a piston rod 82 reciprocally movable to project from or retract into the cylinder tube 81. The front end of the rod 82 is pivotally connected by a pin 84 to the support arm 73 of the vehicle frame 15, and the rear end of the cylinder tube 81 is pivotally connected by a pin 83 to the central bracket 65 of the propelling frame 12. With this arrangement, the vehicle frame 15 is movable to swing in the vertical plane about the pivoted rear end portion thereof in response to activation and de-activation of the cylinder actuator (frame lift mechanism) 16. The cylinder actuator may be a hydraulic actuator, a pneumatic actuator or an electric linear actuator.

Figure 3:
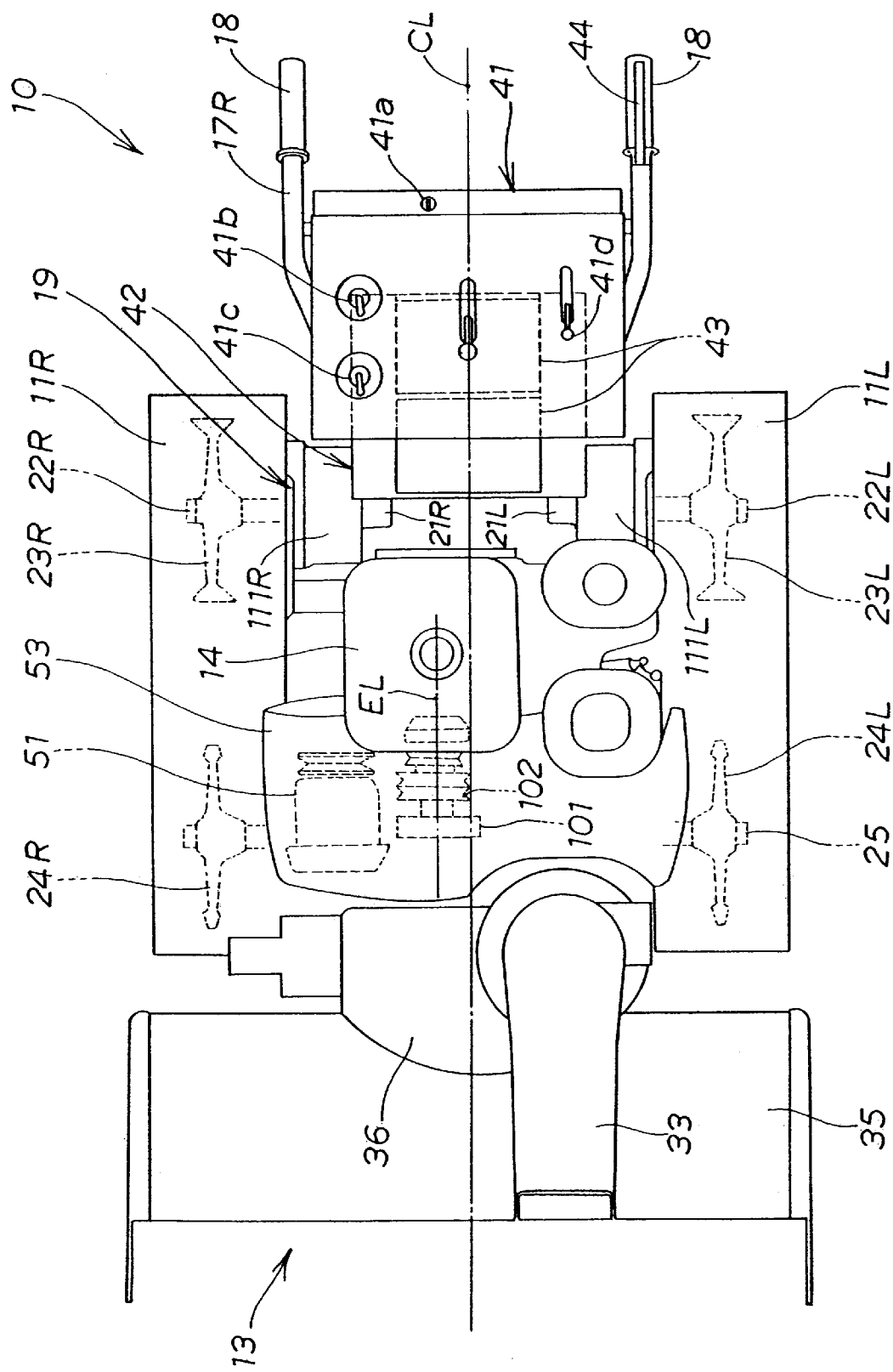
FIG. 3 is a plan view of the crawler snowplow.

As shown in FIG. 3, the engine 14 is disposed on a longitudinal central portion of the vehicle body 19 with the axis EL of an output shaft 14A (FIG. 4) being slightly offset rightward from a longitudinal centerline CL of the vehicle body 19. The control board 41 has a main switch (key switch) 41a, a lift control lever 41b for controlling operation of the frame lift mechanism 16 (FIG. 3), a duct control lever 41c for changing direction of the discharge duct 41c, and a speed control lever 41d for controlling the speed and direction of the electric motors 21L, 21R.

Figure 4:
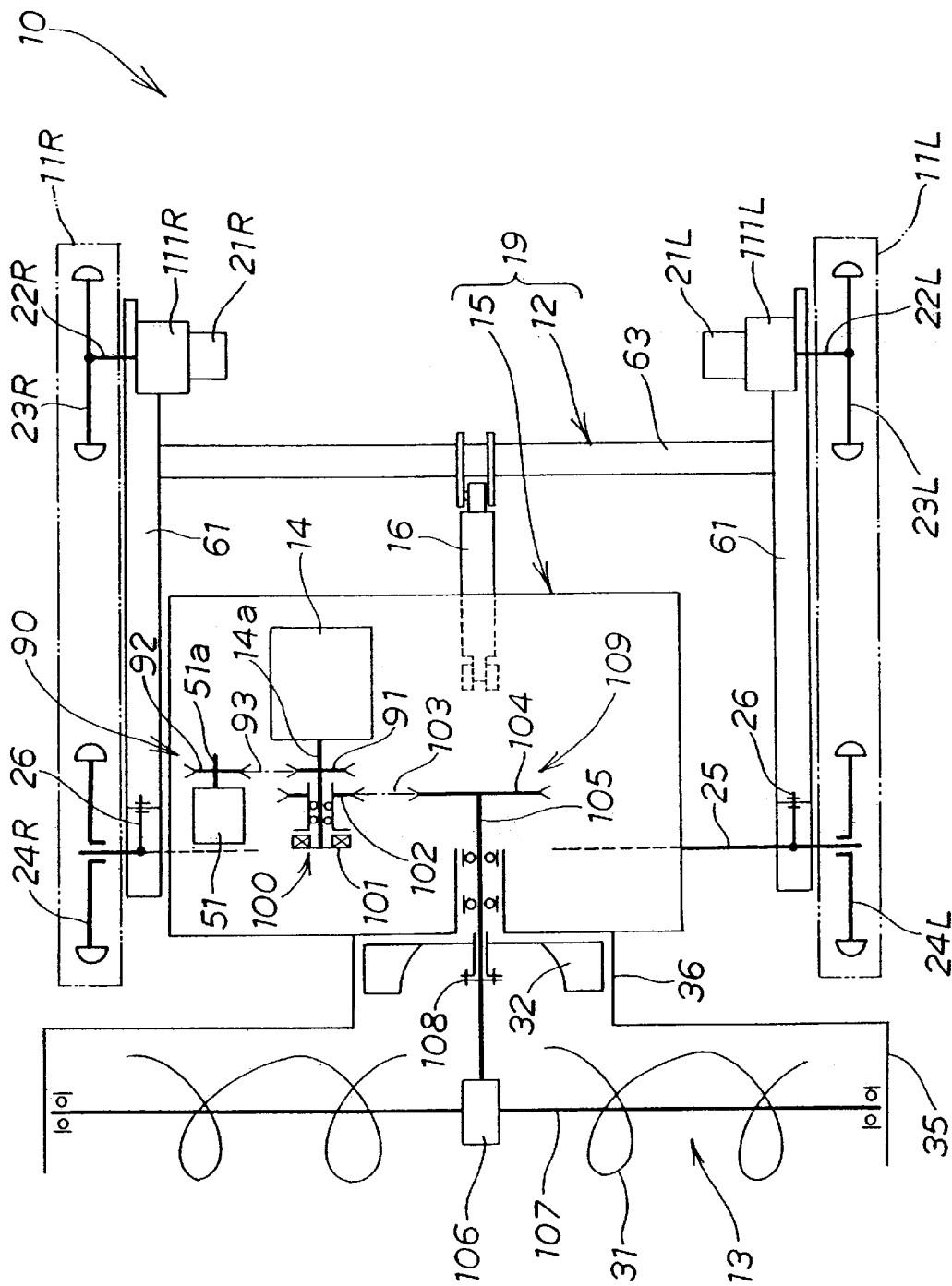
FIG. 4 is a diagrammatical view showing the arrangement of an engine, electric motors, a snowplow mechanism and crawler belts of the crawler snowplow.

FIG. 4 diagrammatically shows a power transmission system of the crawler snowplow 10. As shown in this figure, power from the engine 14 is transmitted to the generator 51 through a charge power transmission system 90 and also to the snowplow mechanism 13 through a snowplow power transmission system 100.

The charge power transmission system 90 has a first driving pulley 91 connected to the output shaft 14a of the engine 14, a first driven pulley 92 connected to a shaft 51a of the generator 51, and a first endless belt 93 connecting the driving pulley 91 and the driven pulley 92. When the engine 51 is running, the generator 51 is driven via the charging power transmission system 90 so that the batteries 43 (FIG. 3) are charged with electric current supplied from the generator 51.

The snowplow power transmission system 100 includes a second driving pulley 102 coupled via the electromagnetic clutch 101 to the output shaft 14a of the engine 14, a second driven pulley 104 connected to one end of a rotating shaft 105, a second endless belt 103 connecting the driving pulley 102 and the driven pulley 104, and a worm gear speed reducing mechanism 106 connected to the other end of the rotating shaft 105.

The rotating shaft 105 is connected to a shaft 107 of the auger 31 via the worm gear speed reducing mechanism 106. The rotating shaft 105 is also connected to a shaft (not designated) of the blower 32 via a coupling 108. While the engine 14 is running, the auger 31 and blower 32 are drivable through the snowplow power transmission system 100 when the electromagnetic clutch 101 is in the engaged state.

Power from the left and right electric motors 21L, 21R is transmitted to the left and right crawlers 11L, 11R respectively through left and right propelling power transmission systems 111L, 111R.

The left propelling power transmission system 111L is comprised of a speed reducer including a set of reduction gears connected to the left electric motor 21L. The speed reducer 111L has an output shaft 22L firmly connected to the left driving wheel 23L and thus serving as a left driving axle. With this arrangement, when the left electric motor 21L is driven in rotation, power from the motor 21L is transmitted via the left propelling power transmission system 111L to the left driving axle 22L and thence to the left driving wheel 23L, thereby driving the left crawler belt 11L.

Similarly, the right propelling power transmission system 111R is comprised of a speed reducer including a set of reduction gears connected to the right electric motor 21R. The speed reducer 111R has an output shaft 22R connected to the right driving wheel 23R and thus serving as a right driving axle. When the right electric motor 21R is driven in rotation, power from the motor 21R is transmitted via the right propelling power transmission system 111R to the right axle 22R and thence to the right driving wheel 23R, thereby driving the right crawler belt 11R.

Thus, each of the left and right electric motors 21L, 21R assembled with the corresponding speed reducer (reduction gear set) 111L, 111R forms a so-called "geared motor" having an output shaft 22L, 22R serving as a rear axle on which the associated driving wheel 23L, 23R is fixed.

Figure 5:
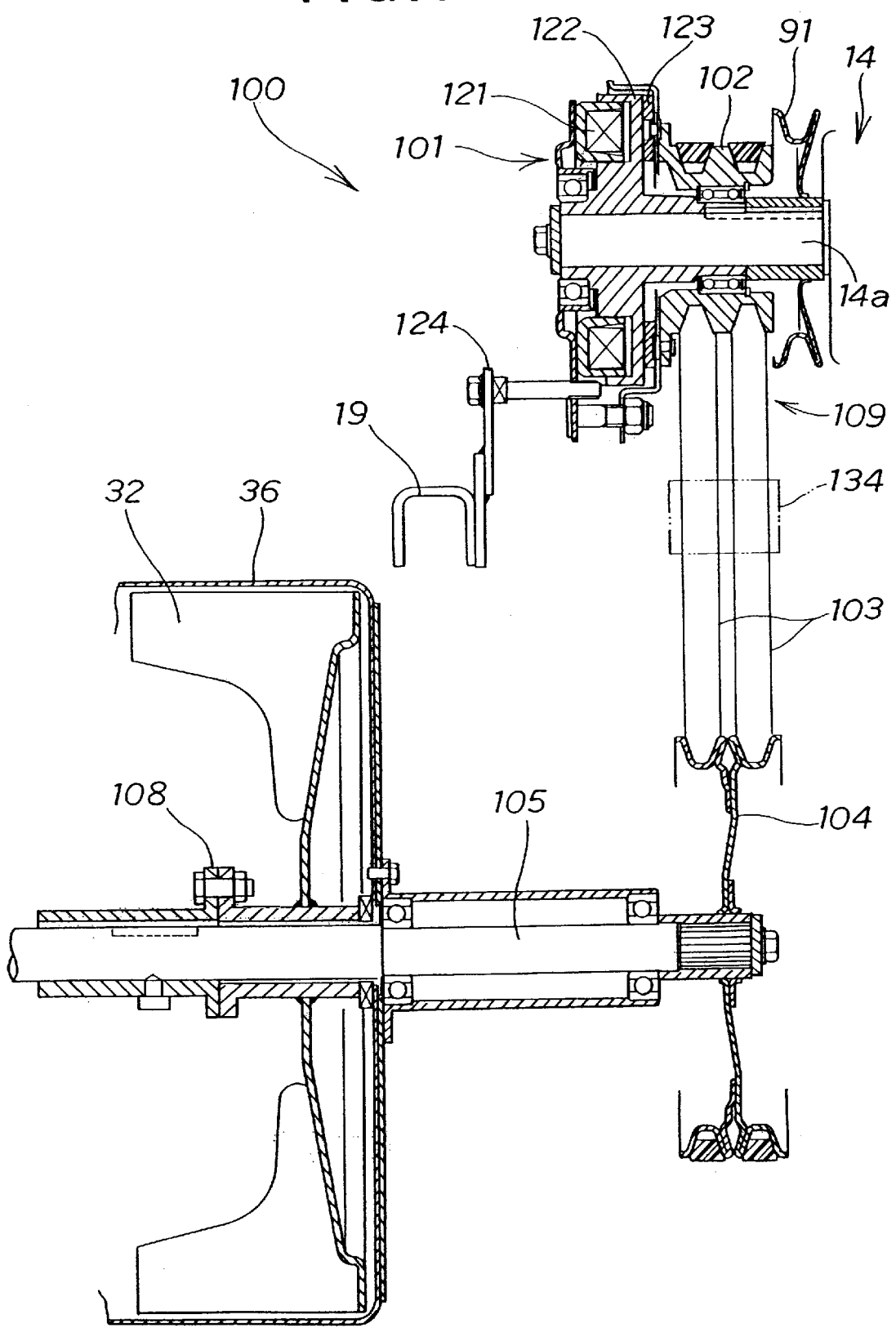
FIG. 5 is a cross-sectional view showing a power transmission system for driving the snowplow mechanism.

As shown in FIG. 5, the electromagnetic clutch 101 is comprised of an electromagnet 121 non-rotatably connected to the vehicle body 19 via a magnet support member 124, a disc 122 firmly connected to the output shaft 14a of the engine 14, and a clutch plate 123 disposed in confrontation to a friction surface (not designated) of the disc 122 with a small air gap defined therebetween. The clutch plate 123 is connected to the second driving pulley 102 so that the electromagnetic clutch 101 is assembled with or built in the second driving pulley 102. The electromagnet 121 is normally de-energized so that the clutch 101 is normally disposed in the disengaged state in which the second driving pulley 102 is disengaged from the output shaft 14a of the engine 14. when the electromagnet 121 is energized, the clutch plate 123 is attracted to the disc 122, thereby engaging the clutch 101. The second driving pulley 102 is thus connected to the output shaft 14a of the engine 14 via the clutch 101 so that power from the engine 14 is transmitted to the rotating shaft 105 and thence to the auger 31 (FIG. 4) and blower 32 of the snowplow mechanism 13.

As shown in FIG. 5, the second driving and driven pulleys 102 and 104 are double grooved pulleys, and two strands of the endless belts 103 are stretched in tandem between the driving and driven pulleys 102, 104. The rotating shaft 105 is rotatably supported by the blower case 36 via roller bearings (not designated).

Figure 6:
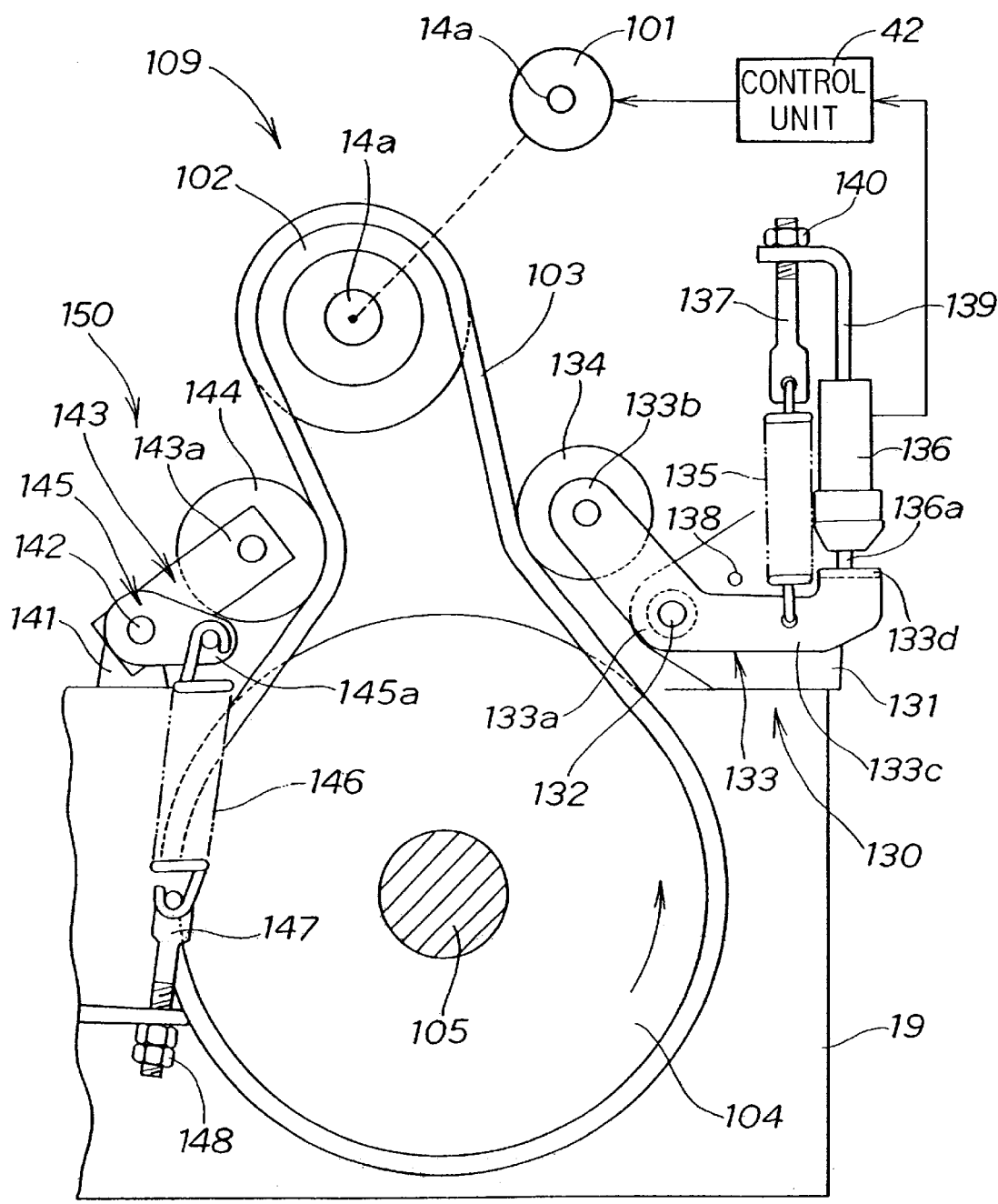
FIG. 6 is a front elevational view of the power transmission system shown in FIG. 5, including an overload protection device associated therewith.

FIG. 6 shows an overload protection device 130 associated with the belt drive power transmission mechanism 109 for protecting the engine 14 against overload.

The overload protection device 130 comprises a tension sensor for detecting a tension in the belt 103 and generating an electric overload signal to disengage the electromagnetic clutch 101 when a belt tension greater than a predetermined value is detected.

In the illustrated embodiment, the overload protection device (tension sensor) 130 includes a bracket 131 attached to the vehicle body 19 at a position located adjacent to a tension side of the endless belt 103, a generally L-shaped lever 133 pivotally connected at a bent central portion 133a thereof to the bracket 131 by means of a horizontal support shaft 132, a tension roller 134 rotatably mounted on one end portion 133b of the lever 133 and disposed on an outer circumferential surface of a free run of the belt 103 on the tension side of the belt 103, a tension coil spring 135 acting between the lever 133 and the bracket 131 and urging the lever 133 to turn counterclockwise in FIG. 6 to thereby keep the tension roller 134 in contact with the outer circumferential surface of the endless belt 103, and a detector unit 136 mounted to the bracket 131 and having a detecting rod 136a confronting the other end portion 133d of the lever 133. The bracket 131 forms a part of the vehicle body 19. The detector unit 136 is comprised of a limit switch having a reciprocally movable rod-like actuator which forms the detecting rod 136a. The detector unit (limit switch) 136 is electrically connected to the electromagnetic clutch 101 via the control unit 42. Thus, the control unit 42 also has a function to control the operation of the electromagnetic clutch 101 in response to operation of the overload protection device (tension sensor) 130. The limit switch may be replaced by a proximity switch.

The tension coil spring 135 has one end connected to a portion of the lever 133 disposed intermediately between the bent central portion 133a and the end portion 133d. The other end of the tension coil spring 135 is connected to an adjustment bolt 137 threaded through a support arm 139 which forms an integral part of the bracket 139. The adjustment bolt 137 is secured by a nut 140 to the support arm 139. Thus, by turning the adjustment bolt 137 with the nut 140 being loosened, the force of the tension coil spring 135 can be adjusted. Numeral 138 denotes a stopper pin projecting from the bracket 131 to limit pivotal movement of the lever 133 in the counterclockwise direction in FIG. 6.

A belt tensioner 150 is disposed on the slack side of the endless belt 103 in diametrically opposite relation to the overload protection device 130 for removing a slack of the endless belt 103. The belt tensioner 150 includes a bracket 141 attached to the vehicle body 19 at a position located adjacent to the slack side of the endless belt 103, a first swing arm 143 pivotally connected at one end to the bracket 141 by means of a horizontal support shaft 142, a tension roller 144 rotatably mounted on a free end 143a of the first swing arm 143 and disposed on an outer circumferential surface of a free run of the belt 103 on the slack side of the belt 103, a second swing arm 145 pivotally mounted on the support shaft 142 and having one end formed integrally with the pivoted end of the first swing arm 143, a tension coil spring 146 acting between the second swing arm 145 and the vehicle body 19 and urging the first and second swing arms 145, 143 to turn clockwise in FIG. 6 to thereby urge the tension roller 144 against the endless belt 103. The bracket 141 forms a part of the vehicle body 19.

The tension coil spring 146 has one end connected to a free end 145 of the second swing arm 145, the other end of the tension coil spring 145 being connected to an adjustment bolt 147 fastened by a double lock nut 148 to a part of the vehicle body 19. Thus, by turning the adjustment bolt 147 with the double lock nut 148 being loosened, the force of the tension coil spring 146 can be adjusted.

Figure 7:
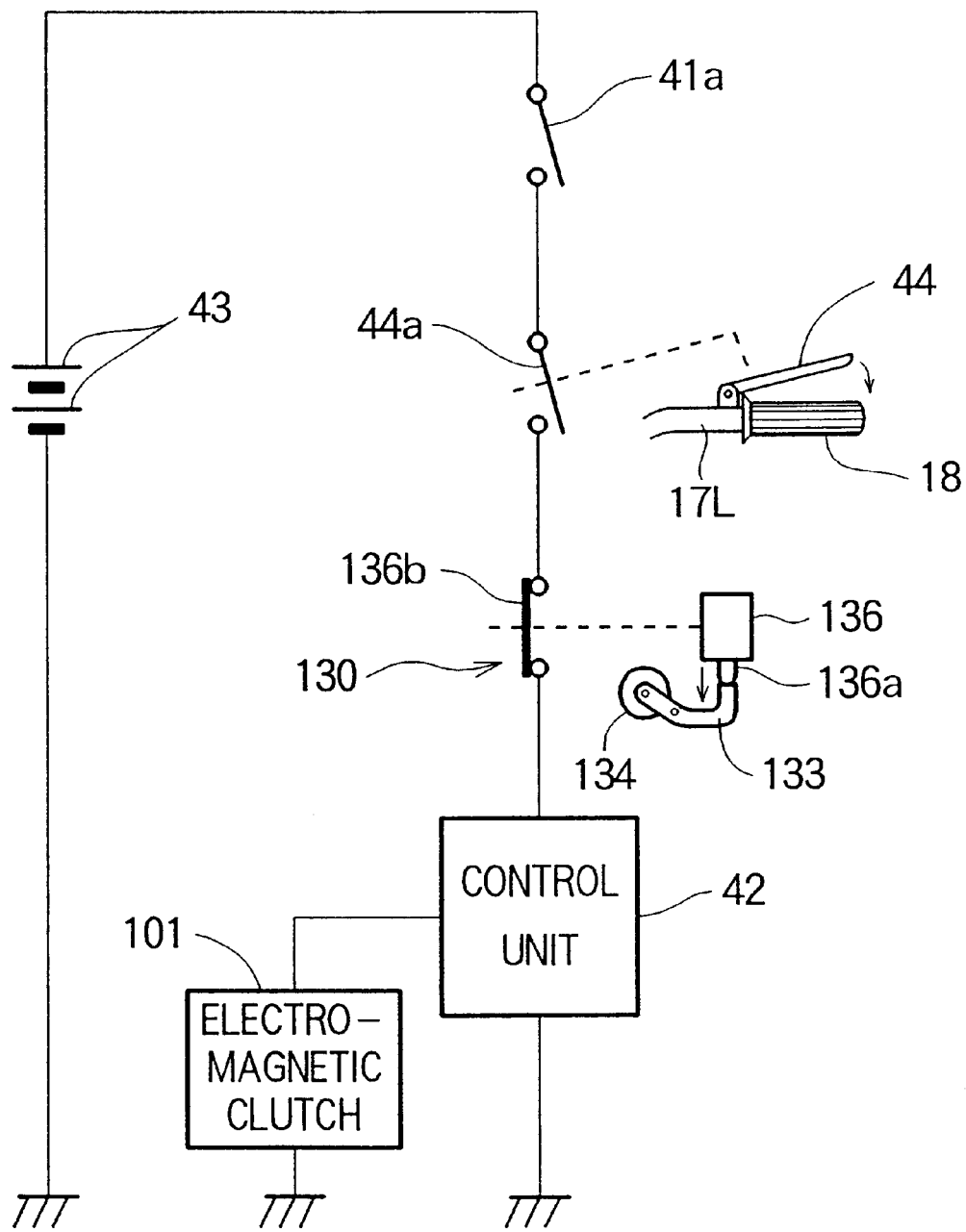
FIG. 7 is a circuit diagram showing the arrangement of the overload protection device.

FIG. 7 is a circuit diagram showing the arrangement of the overload protection device 130. As shown in this figure, the detector unit 136 of the overload protection device 130 has a detection switch 136b connected to the control unit 42 in series with the power supply (batteries) 43, the main switch (key switch) 41a, and a clutch switch 44a. The detection switch 136b is connected to the electromagnetic clutch 101 via the control unit 42. The clutch switch 44a is a normally open contact switch and adapted to be turned on when the clutch lever 44 is gripped by the operator. The detection switch 136b is a normally closed contact switch and is adapted to be turned off when the detecting rod 139 has advanced from its original position in a protruding direction (downward direction in FIG. 7) by a predetermined distance corresponding to the amount of angular movement of the lever 133 in the clockwise direction. An Off signal from the normally closed contact switch 136b forms an overload signal. The detector unit 136 has a bias means (not shown) for urging the detecting rod 136a in the protruding direction, so that angular movement of the lever 133 in the clockwise direction allows the detecting rod 136a to automatically move in the protruding direction by the force of the non-illustrated bias means.

The control unit 42 controls operation of the electromagnetic clutch 101 depending on the state of the switches 41a, 44a, 136b, in a manner as described below.

1) When the clutch lever 44 is manipulated to turn on the clutch switch 44a with the main switch 41a being in the ON state, the electromagnetic clutch 101 is engaged.
2) When the clutch lever 44 is manipulated to turn of f the clutch switch 44a with the main switch 41a being in the ON state, the electromagnetic clutch 101 is disengaged.
3) When in response to angular movement of the lever 133 in the clockwise direction, the detecting rod 136a of the detector unit 136 is allowed to move in the protruding direction by the predetermined distance to turn off the detection switch 136b, the electromagnetic clutch 101 is disengaged.

Operation of the overload protection device 130 will be described below with reference to FIG. 4 and FIG. 8A and 8B.

In FIG. 8A, the electromagnetic clutch 101 is in the ON or engaged state, so that output torque of the engine 14 (FIG. 4) is transmitted from the engine output shaft 14a through the driving pulley 102, the endless belt 103 and the driven pulley 104 to the rotating shaft 105. As a consequence, the auger 31 and blower 32 (both shown in FIG. 4) of the snowplow mechanism 13 operatively connected to the rotating shaft 105 are driven to thereby perform a snow plowing operation.

During that time, the tension roller 134 of the overload protection device 130 is normally urged against the belt 103 by the force W1 of the tension coil spring 135. Under the normal conditions, the engine torque does not exceed the predetermined value, the tension in the belt 103 is not so high as to move the tension roller 134 in a radial outward direction of the endless belt 103 against the force W1 of the tension coil spring 134. Thus, the detecting rod 136a of the detector unit 136 is held in its fully retracted original position confined by the end 133d of the lever 133. Thus, the ON state of the detection switch 136b (FIG. 7) of the detector unit 136 is maintained, and so no detection signal is generated from the detector unit 136.

In general, road surfaces may have undulations and surface irregularities. Accordingly, it may occur that during the snow removing operation, the auger 31 is subjected to a momentary overload when interference occurs between the auger 31 and a protrusion, such as a rock projecting from the road surface. Additionally, since snow deposited on the road surfaces may contain foreign matter, such as stones, wood pieces and blocks of ice, the auger 31 and the blower 32 may be also subjected to a continuous overload when working upon such foreign matter contained in the snow. When subjected to an overload, the auger 31 or the blower 32 is forcibly stopped against rotation and the engine 14 generates an excessively large torque.

In this instance, since the rotating shaft 105 is locked against rotation while the engine output shaft 14a attempts to continue its rotation, the tension run of the endless belt 103 is stretched substantially straight as shown in FIG. 8B whereupon the tension roller 134 is displaced in a radial outward direction of the endless belt 103 against the force W1 of the tension coil spring 135. This movement of the tension roller 133c causes clockwise movement of the lever 133 about the support shaft 132, which allows the detecting rod 136a of the detector unit 136 to move in the protruding direction by the predetermined distance. With this movement of the detecting rod 136a, the normally closed contact detection switch 136b is turned off or opened, whereupon the an electric overload signal (detection signal) is generated from the detector unit 136. The control unit 42 is supplied with the overload signal and shifts the electromagnetic clutch 101 to the OFF or disengaged state. Thus, power transmission (torque transmission) from the engine 14 to the rotating shaft 105 is interrupted, so that the engine 14 is protected against overload.

When a cause of overloading (excessively large torque exerted on the engine output shaft 14a), such as interference between the auger 31 and a rock projecting from the road surface, or entanglement of stones, wood pieces or blocks of ice in the snowplow mechanism 13, is removed, the tension roller 134 automatically returns to the original position shown in FIG. 8A by the force of the tension coil spring 135. During that time, the lever 133 turns counterclockwise to thereby move the detecting rod 136a backward until the detection switch 136b (FIG. 7) is closed or turned on. Now, the snow plowing operation can readily started again by merely manipulating the clutch ever 44 (FIG. 7) to close or turn on the clutch switch 44a.

By thus providing the overload protection device 130, it is possible to eliminate a long downtime, which is unavoidable in the conventional snowplow machine due to a laborious shear bolt replacing work. The overload protection device is able to lessen the working load on the operator, cut down the downtime of the snowplow 10, and improve the efficiency of the snow plowing operation of the snowplow 10.

Additionally, since the engine 14 can maintain its running state even under the overloaded condition, the snowplow 10 can readily resume its snow removing operation when the clutch lever 44 is manipulated after the overload is removed.

Obviously, various minor changes and modifications of the present invention are possible in the light of the above teaching. It is therefore to be understood that within the scope of the appended claims, the present invention may be practiced otherwise than as specifically described.

What is claimed is:

1. A machine comprising: an engine; a transmission having a pair of pulleys, a belt entrained over the pulleys, and an electromagnetic clutch for selectively engaging and disengaging one of the pulleys with an output shaft of the engine; a driven mechanism driven by the engine via the transmission; and a belt tension detecting device for detecting belt tautness associated with an overload condition and supplying an overload signal to effect disengagement of the electromagnetic clutch when the overload condition is detected.

2. A machine according to claim 1; wherein the belt tension detecting device comprises a tension roller, bias means for applying a bias force to urge the tension roller against an outer circumferential surface of the belt to cause a portion of the belt between the pulleys to flex inwardly, and a detector unit for detecting displacement of the tension roller in a direction outward of the belt when the belt is stretched substantially due to the overload condition.

3. A machine according to claim 2; wherein the belt tension detecting device further comprises a pivotally movable lever having a first end on which the tension roller is rotatably mounted, and the detector unit comprises an electric switch having an actuator held in contact with a second end of the lever opposite the first end, the actuator being movable in response to pivotal movement of the lever to turn on and off the switch.

4. A machine according to claim 1; wherein the driven mechanism comprises a snowplow mechanism having a rotating shaft connected to one of the pulleys, an auger and a blower connected in driven relation to the rotating shaft.

5. A machine according to claim 1; wherein the pair of pulleys comprises a driven pulley releasably coupled with the output shaft of the engine, and a driven pulley connected to the rotating shaft.

6. A machine according to claim 1; wherein the detector unit comprises an electric switch electrically connected with the electromagnetic clutch and having an actuator held in contact with the opposite end of the lever, the actuator being movable in response to pivotal movement of the lever to turn on and off the switch.

7. A machine according to claim 1; wherein the clutch comprises an electromagnet non-rotatably mounted to the frame, a disc connected to the output shaft of the engine to undergo rotation therewith, and a clutch plate directly connected to one of the pulleys so as to confront a friction surface of the disc with a small gap therebetween.

8. A machine according to claim 7; wherein the electromagnet is normally de-energized so that the clutch is normally in a disengaged state, and the clutch plate is attracted to the disc when the electromagnet is energized to thereby engage the clutch so that the one pulley is connected to the output shaft of the engine via the clutch and power from the engine is transmitted to the driven mechanism.

* * * * *